Feb. 9, 1932.    A. C. LINDGREN    1,844,860
WINDROW HARVESTER
Filed March 24, 1930
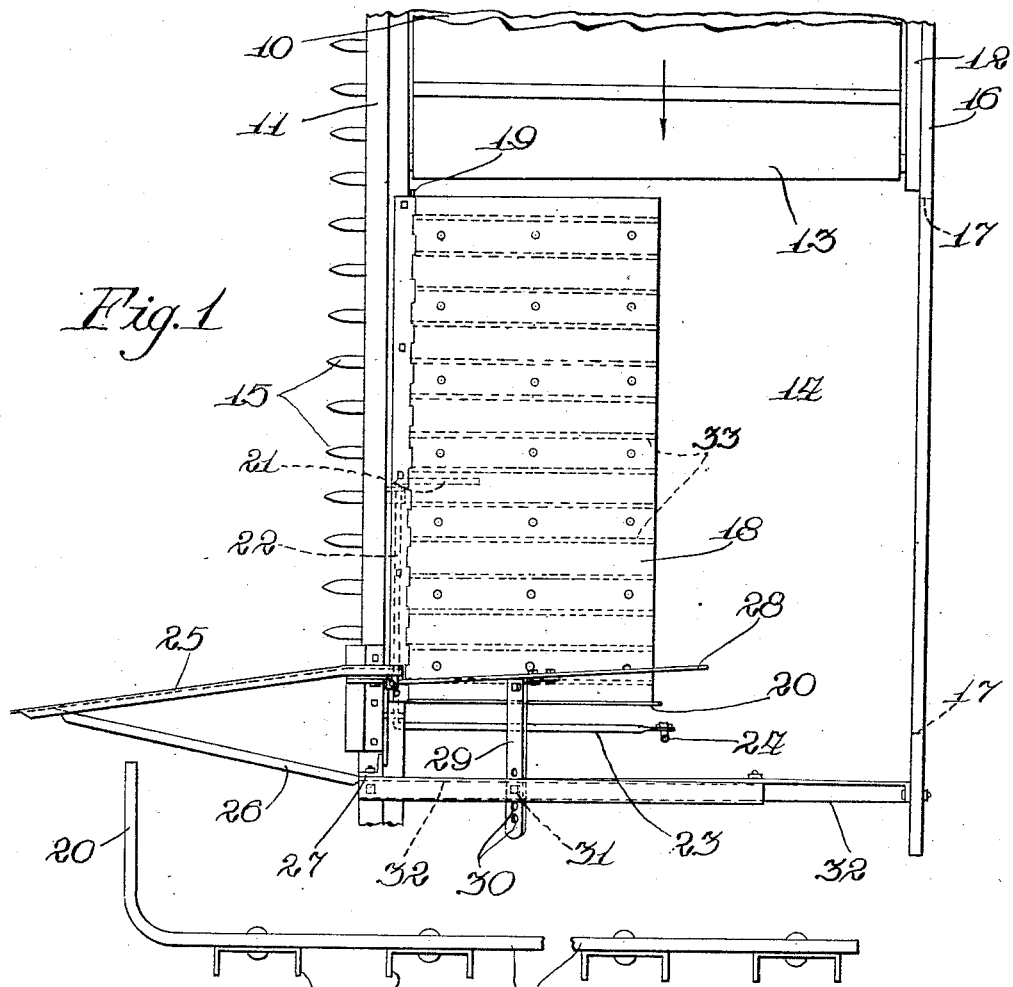
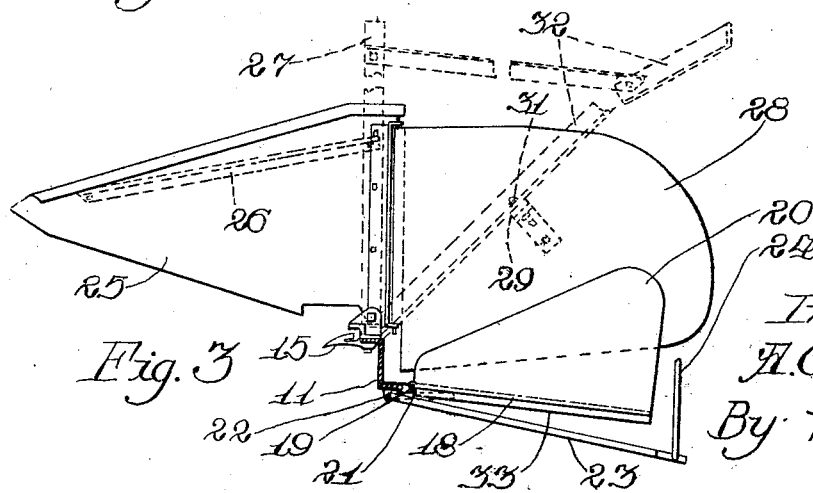
Inventor:
A. C. Lindgren
By W. P. Loveith
Atty.

Patented Feb. 9, 1932

1,844,860

UNITED STATES PATENT OFFICE

ALEXUS C. LINDGREN, OF CHICAGO, ILLINOIS, ASSIGNOR TO INTERNATIONAL HARVESTER COMPANY, A CORPORATION OF NEW JERSEY

WINDROW HARVESTER

Application filed March 24, 1930. Serial No. 438,360.

The invention resides in improvements for a windrow harvester of the type having a platform opening behind a cutter bar and in which opening is arranged a stubble bending and grain discharge retarder plate.

More particularly the invention relates to an improved construction for the plate mentioned whereby it will all the more effectively perform its dual function of bending over the standing stubble and laying the windrow thereon, to the end that a better windrow results, which will be supported off the ground where it will best cure under the action of wind and sun.

In prior windrowers of this type, the retarder and stubble bender plate had a smooth under-surface. As the machine moved forwardly over the stubble, the plate deflected the stubble tops ahead. At the same time, the platform canvas conveyor was discharging the cut grain transversely and, while the force of such discharge was considerably lessened by the retarding action of the top side of the plate in laying the windrow, nevertheless sufficient force of grain discharge remained, especially in heavy crop conditions, to cause the stubble to be deflected transversely of the line of draft beneath the smooth under side of the plate, whereby objectionable spaces were left exposing the ground between the rows of bent over stubble into which the grain would lodge, thus defeating to some extent the purpose of the plate, which was to insure support of the windrow on top of the stubble and off the ground.

Accordingly, the main object of the present invention is to provide an improved plate in which means is provided to prevent this objectionable lateral deflection of the stubble with respect to the line of draft, thereby insuring positively that the stubble will be bent and held forwardly in substantially parallel lines.

Another object is to provide an inside divider construction including an adjustable shield for regulating the position of one marginal edge of the laid windrow.

Other objects will become apparent to those skilled in this art as the disclosure is completed.

These very desirable objects are achieved, in the illustrated form herein chosen by way of example, by providing said plate on its under side with longitudinally arranged, parallel, spaced stubble engaging members, there being a shield adjustably mounted adjacent the stubbleward end of said plate to cooperate therewith.

In the drawings:

Figure 1 is a top plan view of the stubbleward or discharge end of a windrow harvester platform, showing the improvements of the present invention;

Figure 2 is a rear elevational view of the plate per se; and,

Figure 3 is an end elevational view of the main parts of the structure shown in Figure 1, certain of the frame parts in front being shown in dotted lines, so as not to obscure important features located to the rear.

In the drawings the stubbleward or discharge end of the windrow harvester is shown, said harvester being carried on wheels and a main frame not shown. The harvester comprises a platform 10 connected along its forward edge to the usual transverse Z-bar 11, and at its rearward edge, to the usual angle bar 12. The platform carries a canvas endless conveyor 13 running in the stubbleward direction indicated by the arrow, the stubbleward end of the platform being open, as at 14, so that the grain coming from the conveyor will discharge into said opening as is common in windrow harvesters of this type. The cutting mechanism or sickle is indicated by the guards 15 mounted on the Z-bar 11, and the platform backboard appears at 16, there being a tunnel-like opening 17 in the backboard, in line with the platform opening 14, so that the backboard cannot interfere with the windrow being laid.

The plate is shown at 18, hinged by a pintle 19 to the Z-bar and arranged to extend rearwardly and slightly downwardly into the platform opening 14, said plate at its stubbleward end being turned up to form an end wall 20. The plate rests on a crank 21 formed with a rockshaft 22 having another crank arm 23 connected to a support link 24 secured in any appropriate manner to the frame, said mechanism enabling up and down adjustment of the plate in the opening 14.

At the stubbleward end of the cutting mechanism the Z-bar carries an inside divider 25 connected by a brace 26 to an upright angle bar 27 mounted on the Z-bar 11. The rear vertical edge of this divider has pivotally connected thereto a vertically and rearwardly disposed shield 28 extending over the plate 18 and positioned grainwardly of the end wall 20. The shield carries a stubblewardly extending arm 29 having a series of openings 30 for adjustably fixing the position of the shield in or out, by means of a bolt 31 which is secured in suitable frame work 32 mounted on the stubbleward end of the machine.

Stubble engaging and holding members or ribs are secured in parallel, spaced, longitudinal lines to the under side of the plate 18, which ribs may assume the form of channel pieces 33 riveted to the plate, as shown.

In operation, the windrower moves ahead, cutting the grain and depositing the same in the usual manner on the conveyor 13, which is moving laterally in the direction of the platform opening 14. That grain cut in front of the opening 14 merely falls back onto the plate 18. The main body of cut grain comes off the conveyor 13 with considerable force of discharge. The plate 18 thus acts as a retarder and insures that the grain will slide down the sloped plate, so that it can be laid, rather than thrown, on top of the bent over stubble. It will be understood that the grain cut in advance of the plate leaves standing stubble, which the plate bends over forwardly and so holds it while the windrow is being laid thereon. The ribs 33 prevent the stubble from being forced or deflected laterally under the force of the grain being discharged from the conveyor 13. Thus, in effect, positive stubble holding means is associated with the plate stubble deflector or bender, to cause the stubble to be bent only ahead. Therefore, wide open spaces between stubble rows are eliminated, making it impossible for gain in the windrow to lodge on the ground. Accordingly, it follows that the windrow is formed and laid on the tops of temporarily bent over stubble, which stubble, after the plate has passed on, springs up slightly to support the windrow well up above and off the ground, where it will obviously best cure under the action of wind and sunshine.

The width of the windrow can be controlled by adjustably setting the shield 28 in or out, through such means as the openings 30 and the bolt 31. Thus, the outer marginal edge of the windrow can be regulated as to its position in the field within the limits of adjustment provided for the said shield. This is important, especially when the windrower is tractor drawn, as it is possible to keep the outer edge of the windrow over so that the tractor wheels in making a succeeding round of the field will not, and cannot, pack an edge of the windrow by running over it.

The structure thus provided achieves all of the desirable objects heretofore recited for the invention. It is to be understood that it is the intention to cover all such changes and alterations of the example herein chosen for purposes of illustration as do not depart from the spirit and scope of the invention indicated by the definitions thereof constituting the appended claims.

What is claimed is:

1. A windrow harvester comprising, in combination, a sickle, a platform having a discharge opening behind the sickle, a conveyor on the platform feeding to said opening, and means in said opening to bend the stubble forwardly in the path of said means, said means including means for positively engaging said stubble to prevent lateral deflection thereof relative to the direction of travel.

2. A windrow harvester comprising, in combination, a platform having an opening therein and a cutting mechanism in front of the platform and opening, a conveyor on the platform feeding to said opening, a plate in said opening to receive the grain from the conveyor and to lay said grain on the tops of stubble bent over by the under side of said plate, and stubble engaging means secured to the under side of said plate.

3. A windrow harvester comprising, in combination, a sickle, a platform having a discharge opening behind the sickle, a conveyor on the platform feeding to said opening, a plate in said opening to bend the stubble forwardly in the path of the plate, and ribs on the under side of said plate for engaging the bent over stubble to prevent lateral deflection thereof relative to the direction of travel.

4. A windrow harvester comprising, in combination, a sickle, a platform having a discharge opening behind the sickle, a conveyor on the platform feeding to said opening, a plate in said opening to bend the stubble forwardly in the path of the plate, and ribs arranged under the plate in longitudinal, spaced, parallel lines for engaging the bent over stubble to prevent lateral deflection thereof relative to the direction of travel.

5. A windrow harvester comprising, in combination, a sickle, a platform having a discharge opening behind the sickle, a conveyor on the platform feeding to said opening, a plate in said opening to bend the stubble forwardly in the path of the plate, and channel shaped members arranged longitudinally underneath the plate providing stubble holding ribs to prevent the bent over stubble from being deflected laterally.

6. In a harvester, means for conveying cut grain to a point of discharge, means interposed between said point of discharge and the standing stubble for retarding the discharge of grain and for bending over the tops of standing stubble in one direction, and means for holding said bent over stubble against lateral deflection while so bent over.

7. In a harvester, means for cutting grain, means for receiving and conveying cut grain to a point of discharge, means at the point of discharge and located rearwardly of the cutting means for causing the grain to spend force as it is deposited in the field in a windrow, said means also holding the standing stubble in its path bent over while the windrow is being laid thereon, and means cooperating with said retarding and bending means to engage said stubble to prevent its lateral deflection while the windrow is beind laid.

8. In a harvester, a conveyor for conveying cut grain to a point of discharge, a cutting mechanism, a normally downwardly sloped plate located at the point of discharge of said conveyor and rearwardly of the cutting mechanism, and stubble engaging ribs secured to the under side of said plate.

9. In a harvester, a conveyor for conveying cut grain to a point of discharge, a cutting mechanism, a stubble engaging and windrow laying means located at the point of discharge of said conveyor and rearwardly of the cutting mechanism, and a shield arranged adjacent the end of said means remote from the conveyor.

10. In a harvester, a conveyor for conveying cut grain to a point of discharge, a cutting mechanism, a stubble engaging and windrow laying means located at the point of discharge of said conveyor and rearwardly of the cutting mechanism, and a vertically disposed shield pivotally mounted adjacent the end of said means remote from the conveyor, and means for adjustably setting said shield in or out relative to said means.

11. In a harvester, a conveyor for conveying cut grain to a point of discharge, a cutting mechanism, a plate located at the point of discharge of said conveyor and rearwardly of the cutting mechanism, and a vertical end wall on the end of said plate remote from the conveyor.

12. In a windrow harvester, the combination of a platform having a transverse bar along its front edge, a conveyor on the platform feeding to an opening therein behind the bar, cutting mechanism on the bar, a plate on the bar extending rearwardly into the opening, an inside divider at the stubbleward end of the bar, a vertical shield pivotally mounted adjacent the divider and forming a stubbleward end wall for the plate, and means for adjustably setting said plate in a plurality of positions toward or away from said plate.

13. A stubble bending and windrow laying device for windrow harvesters, said device comprising a plate having means for securement of an edge thereof to the Z-bar of the harvester, and ribs secured to the under side of the plate.

14. A stubble bending and windrow laying device for windrow harvesters, said device comprising a plate having means for securement of an edge thereof to the Z-bar of the harvester, said plate having parallel ribs secured to the under side thereof and having a smooth upper side.

15. A stubble bending and windrow laying device for windrow harvesters, said device comprising a plate having means for securement of an edge thereof to the Z-bar of the harvester and having one end turned up to form an end wall, and rib members secured to the under side of the plate.

In testimony whereof I affix my signature.

ALEXUS C. LINDGREN.